(No Model.)
J. EVETTS.
DISINFECTING APPARATUS.
No. 576,064. Patented Jan. 26, 1897.
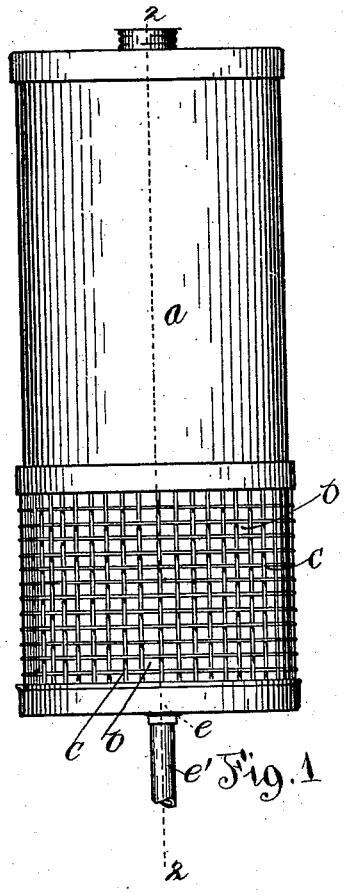
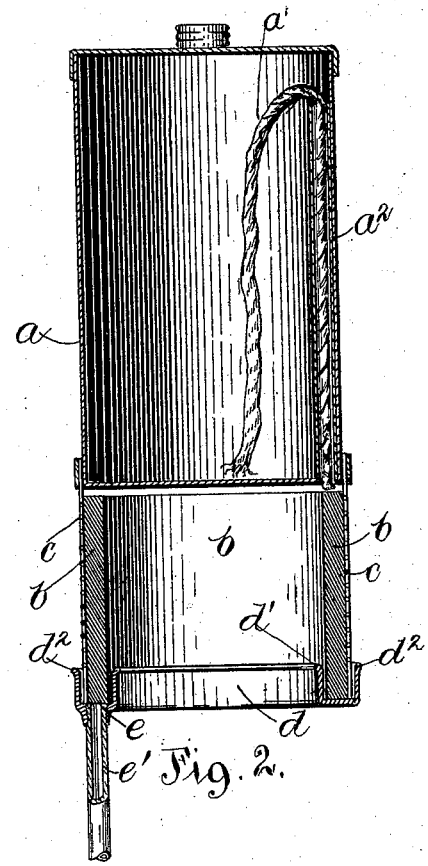
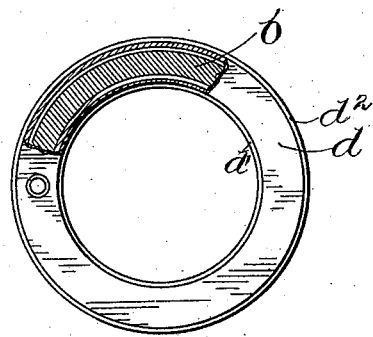
Witnesses:
Inventor:

UNITED STATES PATENT OFFICE.

JAMES EVETTS, OF CHICAGO, ILLINOIS.

DISINFECTING APPARATUS.

SPECIFICATION forming part of Letters Patent No. 576,064, dated January 26, 1897.

Application filed October 28, 1895. Serial No. 567,208. (No model.)

*To all whom it may concern:*

Be it known that I, JAMES EVETTS, a subject of the Queen of Great Britain, residing at Chicago, in the county of Cook and State of Illinois, have invented a certain new and useful Improvement in Disinfecting Apparatus, of which the following is a full, clear, concise, and exact description, reference being had to the accompanying drawings, forming a part of this specification.

My invention relates to disinfecting apparatus; and its object is to provide a simple, cheap, and effective means for automatically supplying disinfecting fluid to water-closets, urinals, or other places requiring disinfecting, at the same time disseminating from the evaporating-surfaces the volatile part of the disinfecting fluid, thus effectually neutralizing and killing all noxious vapors or microorganisms which may be present both on the contaminated surfaces and in the surrounding air.

The invention consists in a disinfecting apparatus embodying a suitable reservoir for disinfecting fluid, having in connection therewith a body of absorbent material arranged around and suitably protected by a perforated or netted chamber so constructed as to allow free access to the air, for the purpose of evaporation, both from the interior and exterior. This absorbent material rests in and is retained in position by a trough-like receiver having an outlet through which the surplus fluid may escape to be led through a tube or pipe to the receptacle to be disinfected or from which the surplus fluid may flow directly into such receptacle. The outlet described is so situated that the disinfecting fluid before reaching it must necessarily pass through and saturate the whole body of absorbent material or a greater portion thereof.

Heretofore it has been customary to saturate a body of absorbent material in a dense form, which has restricted the operation of evaporation to its outer surfaces, whereas with my invention it will be seen that evaporation takes place under the most favorable conditions, inasmuch as both the inner and outer surfaces are available for this purpose. Furthermore, owing to the fact that the supply to and discharge from the absorbent material are situated at diametrically opposite points, a constant supply of fresh fluid may be depended upon for the evaporating-surfaces, thereby preventing the stagnation of the fluid in the absorbent material after its efficiency is impaired.

I will describe my invention more in particular with reference to the accompanying drawings, in which—

Figure 1 is a view in elevation of a disinfecting apparatus embodying my invention. Fig. 2 is a sectional view thereof on line 2 2, Fig. 1. Fig. 3 is a bottom view thereof shown partly in section.

Like letters refer to like parts throughout the several figures.

The disinfecting fluid contained within the cylindrical chamber $a$ is conveyed by means of a wick $a'$ through a tube $a^2$ to the top of a wick $b$, of absorbent material, which is contained within and supported by a wire-netting $c$, fastened to the lower end of the chamber $a$. A trough-like receiver $d$ is attached to the lower end of the wire-netting $c$, said receiver having an outlet $e$ diametrically opposite to the point at which the wick receives its supply of disinfecting fluid from the wick $a'$.

The trough-like receiver $d$ is provided with outwardly-projecting lips $d'$ $d^2$, adapted to prevent the escape of disinfecting fluid to the outer surface of the same should such fluid run down outside the wire-netting.

A pipe $e'$ leads from the outlet $e$ for the purpose of conveying the surplus disinfecting fluid to the receptacle to be disinfected.

The disinfecting fluid from the chamber $a$ is drawn down through the tube $a^2$ by means of the wick $a'$, thence passing to the large wick $b$, of absorbent material, thoroughly saturating the same for the purpose of evaporation, and the surplus is collected by the trough $d$ and escapes through the outlet $e$ to the receptacle to be disinfected.

Having thus described my invention, what I claim as new, and desire to secure by Letters Patent, is—

1. In a disinfecting apparatus, the combination with a reservoir $a$ adapted to contain disinfecting fluid, of a wick $a'$, a cylindrical body of absorbent material $b$, communicating with said reservoir $a$ through the medium of said wick $a'$, a perforated or netted support $c$ for said absorbent material, a trough-like receiver or collector $d$ placed beneath said absorbent material, and an outlet $e$ in said collector, communicating with the urinal, closet, or similar place requiring disinfecting, substantially as described.

2. In a disinfecting apparatus, the combination with the reservoir $a$ adapted to contain disinfecting fluid, of a cylindrical wick or similar body of absorbent material $b$, a wick $a'$ adapted to convey disinfecting fluid to said absorbent material $b$, a perforated or netted support $c$ for said absorbent material, a trough-like receiver or collector placed beneath said absorbent material, and adapted to collect the surplus disinfecting fluid after its passage through said absorbent material, lips $d'$ $d^2$ provided upon the edges of said collector, and an outlet $e$, at a point substantially opposite that where the absorbent material $b$ receives its supply of disinfecting fluid from wick $a'$, thereby preventing stagnation of such fluid in the absorbent material, and securing effective circulation of the fluid, substantially as described.

In witness whereof I hereunto subscribe my name this 1st day of October, A. D. 1895.

JAMES EVETTS.

Witnesses:
   DE WITT C. TANNER,
   GEORGE L. CRAGG.